US009769610B1

(12) United States Patent
Gordon et al.

(10) Patent No.: US 9,769,610 B1
(45) Date of Patent: Sep. 19, 2017

(54) ADAPTIVE LOCATION SHARING BASED ON PROXIMITY

(71) Applicant: GOOGLE INC., Mountain View, CA (US)

(72) Inventors: David Robert Gordon, New York, NY (US); Michael Hintze, Brooklyn, NY (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/153,027

(22) Filed: May 12, 2016

(51) Int. Cl.
| | |
|---|---|
| H04W 24/00 | (2009.01) |
| H04W 4/02 | (2009.01) |
| H04L 29/12 | (2006.01) |
| H04W 4/12 | (2009.01) |
| G06F 3/0482 | (2013.01) |
| G06F 3/0484 | (2013.01) |
| G06F 3/0481 | (2013.01) |

(52) U.S. Cl.
CPC .......... *H04W 4/023* (2013.01); *G06F 3/0482* (2013.01); *G06F 3/04817* (2013.01); *G06F 3/04842* (2013.01); *H04L 61/1594* (2013.01); *H04W 4/12* (2013.01)

(58) Field of Classification Search
CPC .................................................... H04W 4/008
USPC ..... 455/456.6, 456.1, 456.3, 456.2; 342/451, 342/457, 350; 705/319; 701/533, 465
See application file for complete search history.

(56) References Cited

U.S. PATENT DOCUMENTS

| | | | |
|---|---|---|---|
| 8,538,458 B2 | 9/2013 | Haney | |
| 9,049,543 B2 | 6/2015 | Dicke et al. | |
| 2008/0132251 A1* | 6/2008 | Altman | G06Q 30/0207 455/457 |
| 2009/0325603 A1* | 12/2009 | Van Os | H04W 4/02 455/456.2 |
| 2010/0280965 A1* | 11/2010 | Vesterinen | G06F 21/6245 705/319 |

(Continued)

FOREIGN PATENT DOCUMENTS

WO WO-2015/103067 A1 7/2015

OTHER PUBLICATIONS

Iachello et al., "Control, Deception, and Communication: Evaluating the Deployment of a Location-Enhanced Messaging Service", M. Beigl et al. (Eds.): UbiComp 2005, LNCS 3660, pp. 213-231.

(Continued)

*Primary Examiner* — Kiet Doan
(74) *Attorney, Agent, or Firm* — Marshall, Gerstein & Borun LLP

(57) ABSTRACT

A method for providing adaptive location sharing based on proximity may include identifying a group of entities (people and/or places) associated with a target person, receiving, from a mobile communications device associated with the target person, location data indicative of a current geographic location of the target person, determining, using the location data, that the target person is proximate to at least a first entity of the group, generating a proximity message, and sending the proximity message to a remote monitoring device to cause the remote monitoring device to display a location-based status of the target person. The location-based status does not specify any geographic location of the target person.

19 Claims, 9 Drawing Sheets

(56) References Cited

U.S. PATENT DOCUMENTS

| | | | |
|---|---|---|---|
| 2011/0071754 A1* | 3/2011 | Ruckart | G01C 21/005 701/533 |
| 2012/0008526 A1* | 1/2012 | Borghei | H04W 4/021 370/254 |
| 2012/0144452 A1 | 6/2012 | Dyor et al. | |
| 2012/0233024 A1* | 9/2012 | Boyd | G06Q 30/0207 705/26.61 |
| 2013/0029686 A1* | 1/2013 | Moshfeghi | G01S 19/48 455/456.1 |
| 2013/0218681 A1* | 8/2013 | Haney | H04W 4/08 705/14.58 |
| 2014/0062790 A1* | 3/2014 | Letz | H04L 67/1095 342/386 |
| 2014/0189802 A1* | 7/2014 | Montgomery | H04L 63/08 726/4 |
| 2014/0210616 A1 | 7/2014 | Ramachandran | |

OTHER PUBLICATIONS

International Search Report and Written Opinion for Application No. PCT/US2017/031179, dated Jul. 13, 2017.

\* cited by examiner

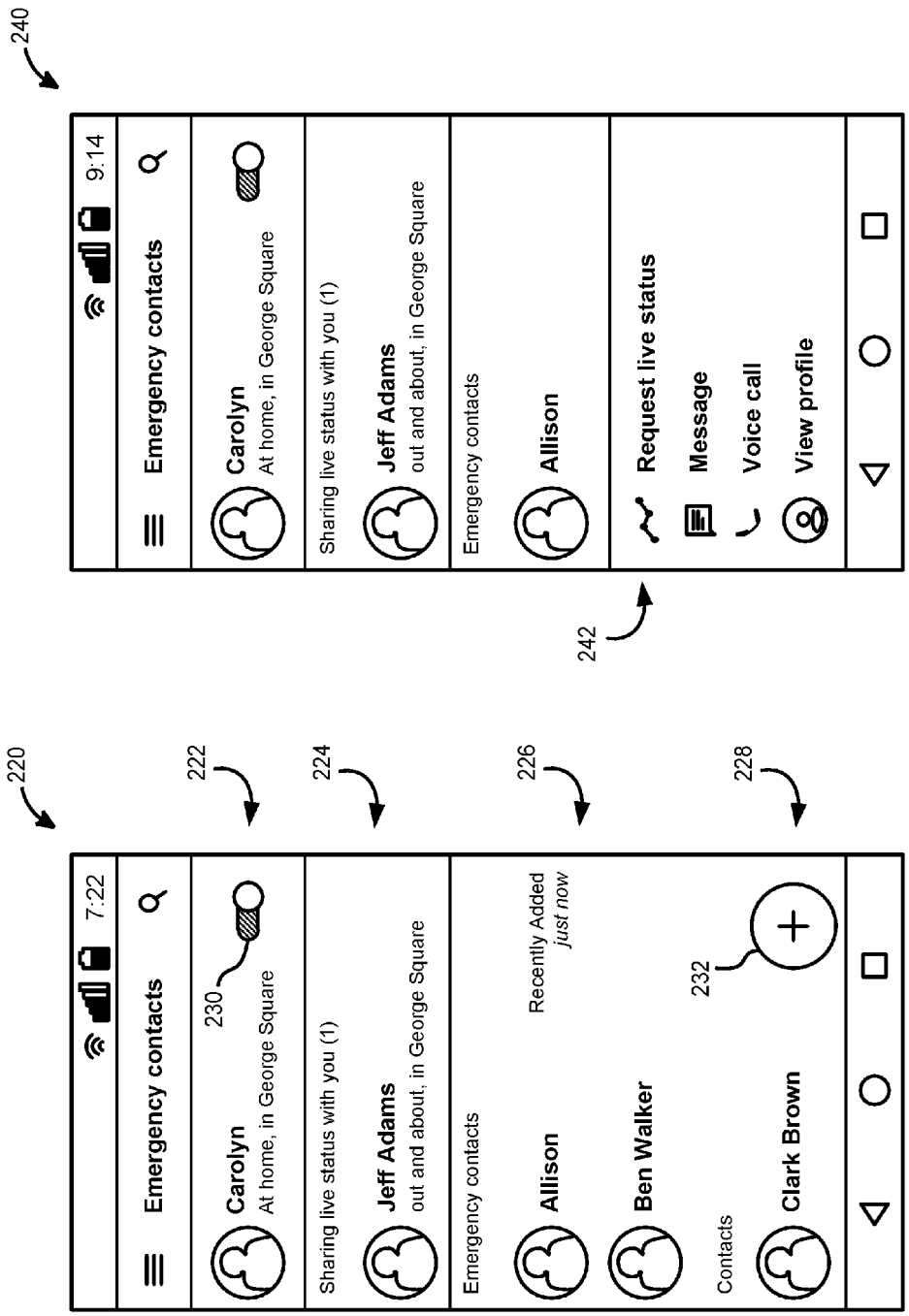

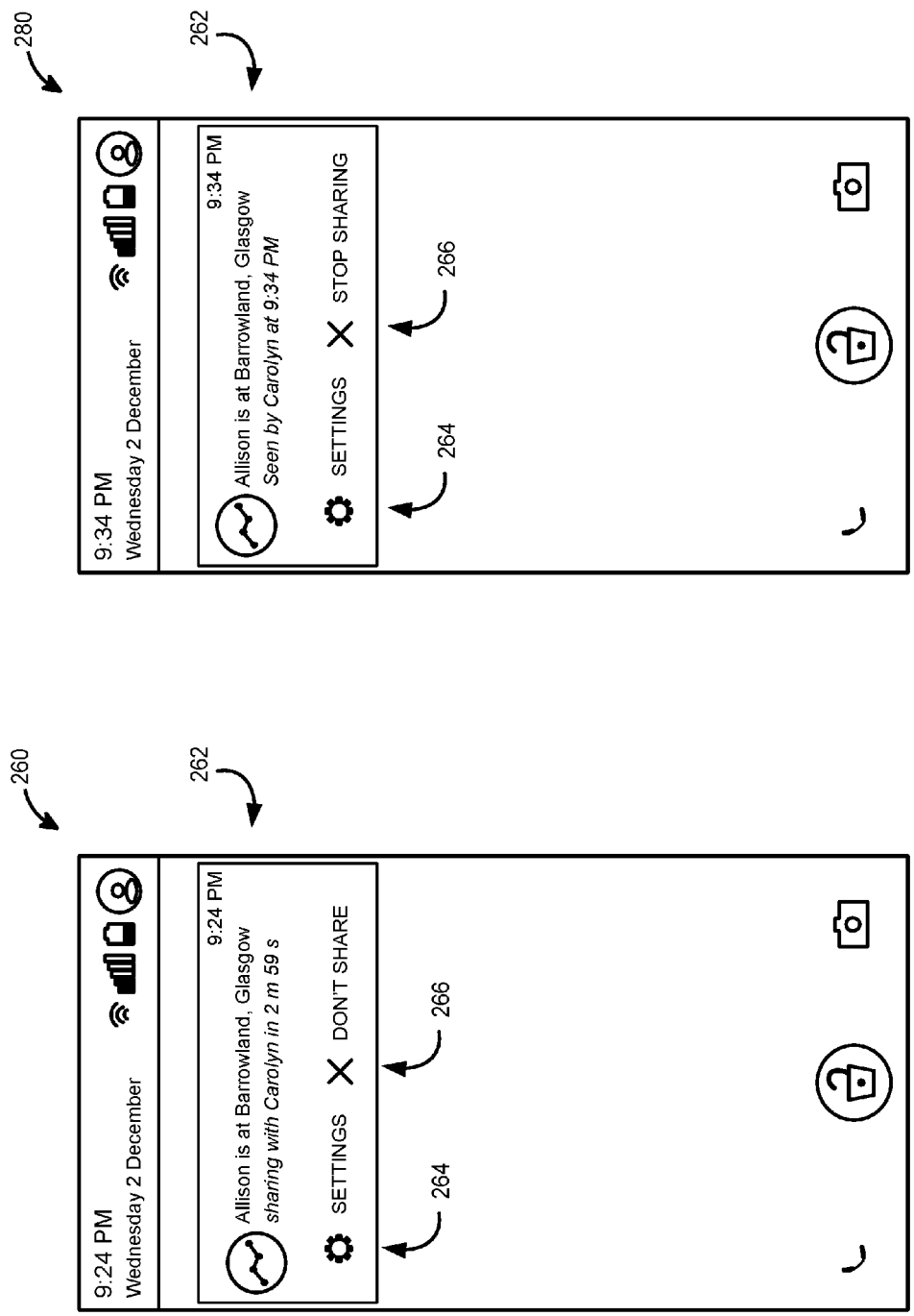

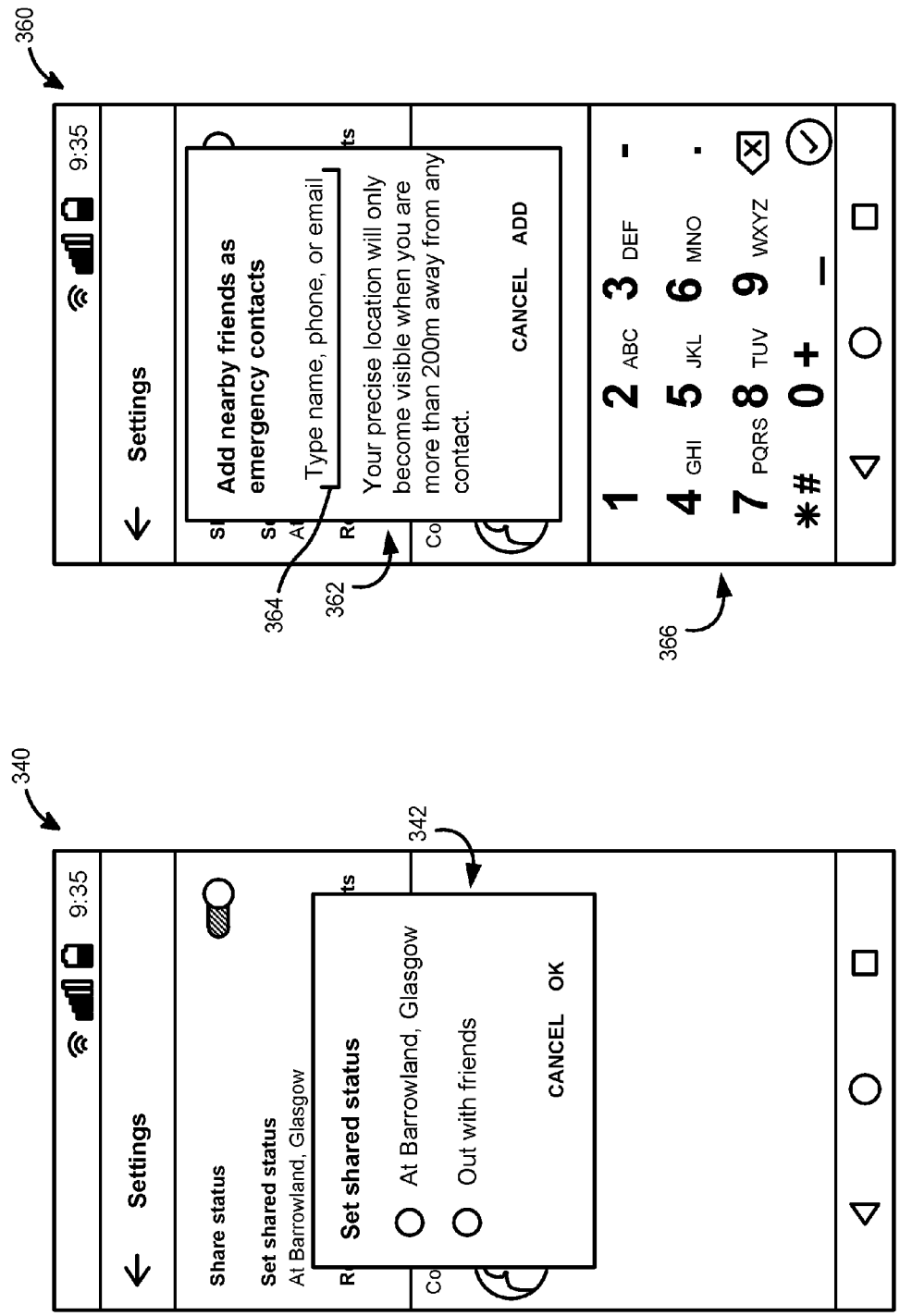

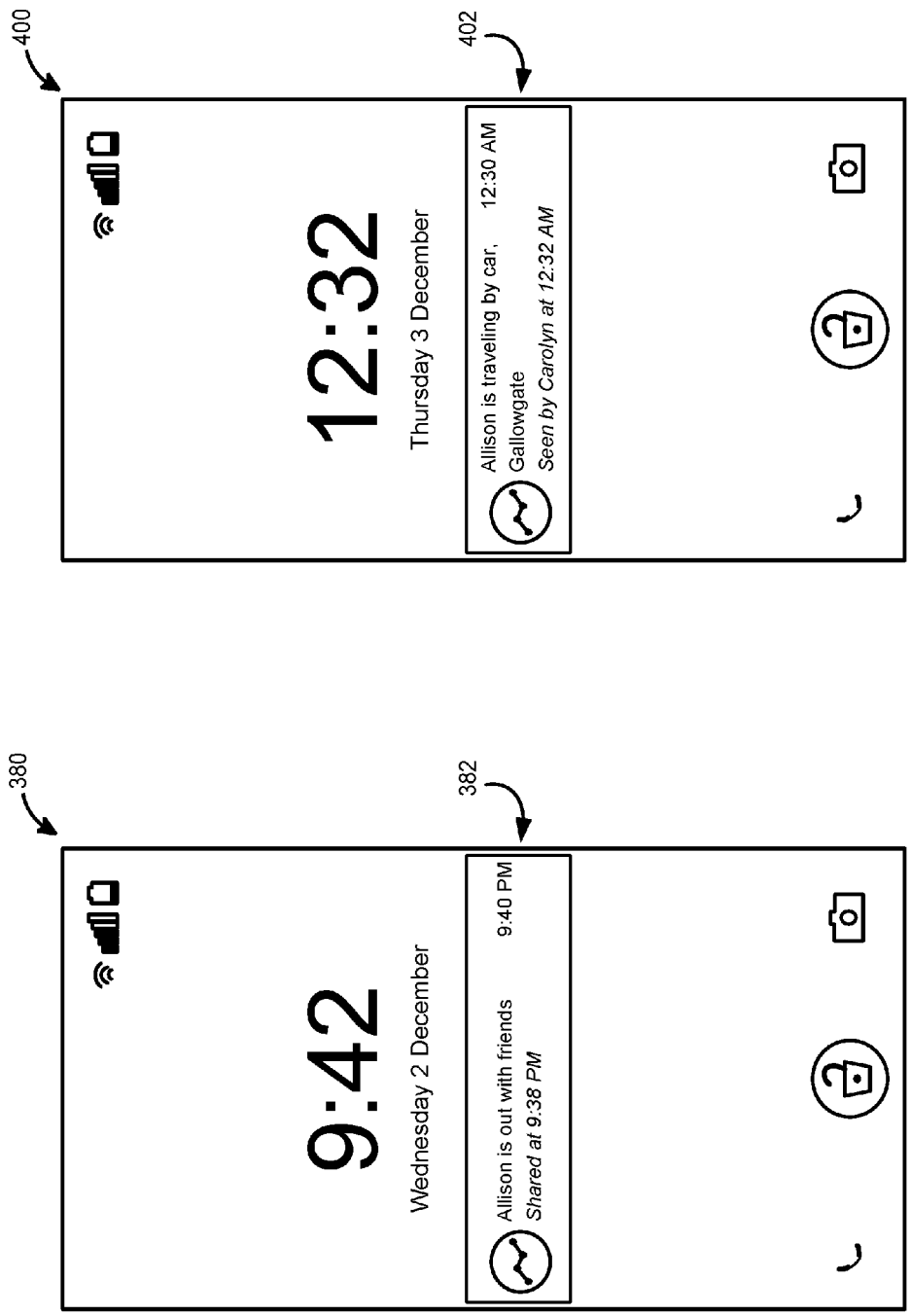

ADAPTIVE LOCATION SHARING BASED ON PROXIMITY

FIELD OF TECHNOLOGY

The present disclosure relates to location sharing and, more particularly, to systems and methods for adaptively sharing different types of location-related information based on proximity to particular people and/or places.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Today, location sharing technology uses the locating/positioning functionality of a smartphone or other device to communicate one person's current geographical location to another person or people. However, continuous location sharing is often not ideal. For instance, while continuous location sharing may in some instances be beneficial for safety or other reasons, such sharing may be viewed as an invasion of privacy. Balancing competing interests such as these has proven to be problematic with current location sharing technology.

SUMMARY

In some implementations described herein, the current geographic location of a "target" person is shared with another, "monitoring" person when certain criteria are not satisfied, and is not shared when the criteria are satisfied. The criteria may relate to the proximity of the target person to a particular person, to a particular place, or to any member(s) of a group of particular people and/or places. For example, the criteria may require that the target person be within some threshold distance (e.g., 200 meters, one mile, etc.) of a designated group member. When the criteria are satisfied, other generalized information that is derived from the location of the target person may instead be provided to the monitoring person, without revealing the target person's geographic location. The generalized information may, for example, be a status indicating to the monitoring person that the target person is in a relatively safe or familiar location (e.g., a message reading "in a safe place" if the target person is at home or work, or reading "out with friends" if the target person is near anyone on an emergency contacts list, etc.), a status indicating current availability of the target person (e.g., a message reading "not available" if the target person is at work or another designated location, or with a designated person, etc.), and so on.

In one example embodiment, a method for providing adaptive location sharing based on proximity is implemented in one or more servers having one or more processors. The method includes identifying, by the one or more processors, a group of one or more entities associated with a target person. The one or more entities include one or both of (i) one or more people associated with the target person and (ii) one or more places associated with the target person. The method also includes receiving, by the one or more processors and from a first mobile communications device associated with the target person, location data indicative of a current geographic location of the target person, and determining, by the one or more processors and using the location data, that the target person is proximate to at least a first entity of the group. The method also includes, after determining that the target person is proximate to at least the first entity, generating, by the one or more processors, a proximity message, and sending the proximity message to a remote monitoring device to cause the remote monitoring device to display a location-based status of the target person. The location-based status does not specify any geographic location of the target person.

In another example embodiment, a system for providing adaptive location sharing based on proximity includes a first memory storing a database containing data associating each of a plurality of people with a respective one of a plurality of groups of one or more entities, one or more servers having one or more processors, and a second memory. The second memory stores instructions that, when executed by the one or more processors, cause the one or more servers to identify, by accessing the database, a group of one or more entities associated with the target person. The one or more entities include one or both of (i) one or more people associated with the target person and (ii) one or more places associated with the target person. The instructions also cause the one or more servers to receive, from a first mobile communications device associated with the target person, location data indicative of a current geographic location of the target person, and determine, using the location data, that the target person is proximate to at least a first entity of the group. The instructions also cause the one or more servers to, after determining that the target person is proximate to at least the first entity, generate a proximity message, and send the proximity message to a remote monitoring device to cause the remote monitoring device to display a location-based status of the target person. The location-based status does not specify any geographic location of the target person.

In another example embodiment, a method for managing sharing of location-based status information with a monitoring person is implemented in a mobile communications device associated with a user. The method includes detecting a user selection, made via a user interface of the mobile communications device, of a first location sharing mode for the monitoring person from among a plurality of available location sharing modes, detecting one or more user inputs, made via the user interface, specifying a triggering group of one or more people, sending, to a remote computing system, data indicative of (i) the first location sharing mode, and (ii) the triggering group, to cause the remote computing system to configure a location sharing setting of the user such that geographic locations of the user are not to be shared with the monitoring person unless the user is more than a threshold distance away from the triggering group, and sending, to the remote computing system, location data indicative of current geographic locations of the user to enable the remote computing system to selectively share or not share particular ones of the current geographic locations with the monitoring person in accordance with the configured location sharing setting.

BRIEF DESCRIPTION OF THE DRAWINGS

FIGS. 3A-3J depict a series of example interactive user interface displays that may be presented to various users in an adaptive location sharing system, according to one implementation and scenario.

DETAILED DESCRIPTION OF THE DRAWINGS

Overview

Figure 1:
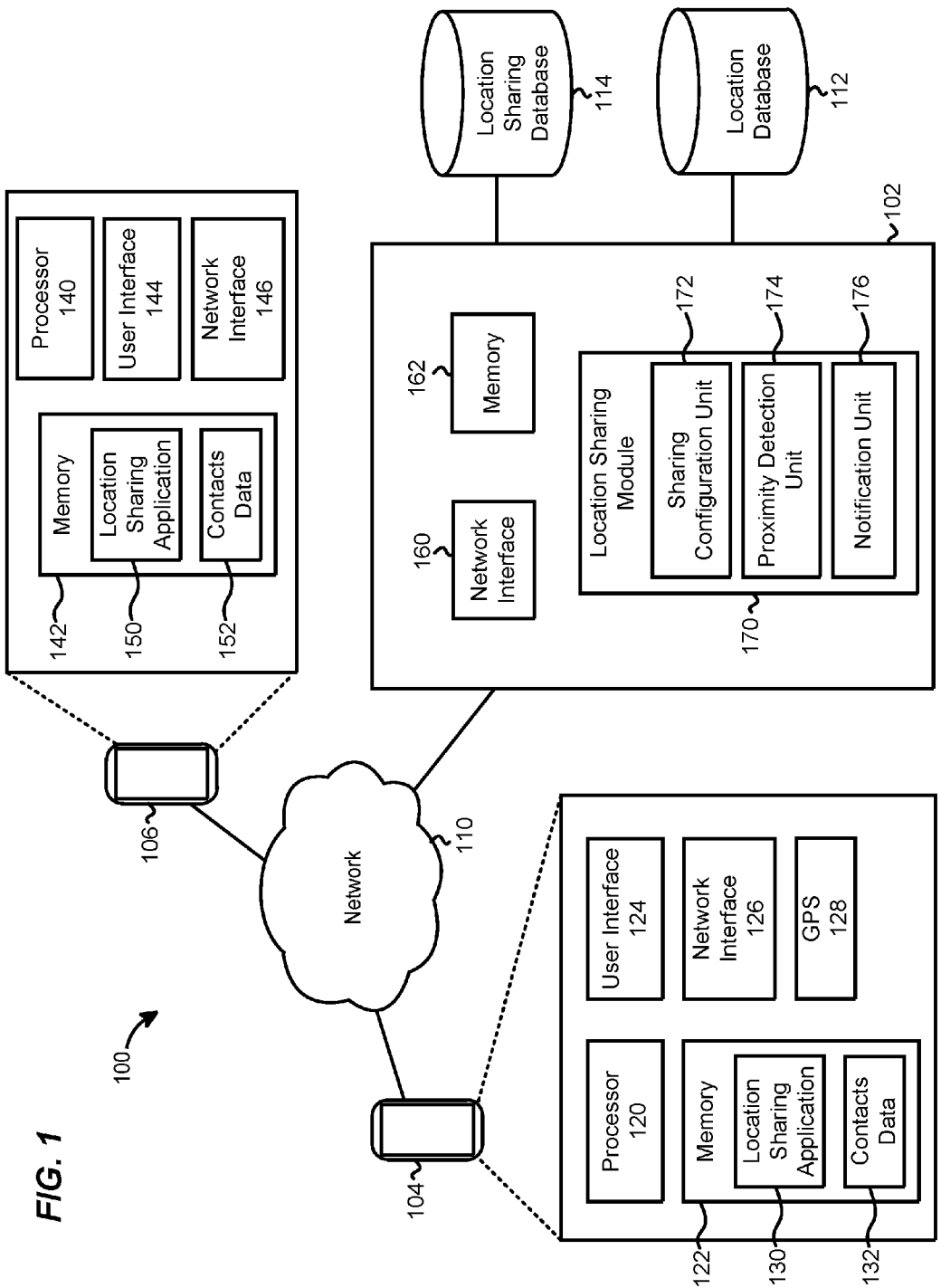
FIG. 1 is a block diagram of an example system in which techniques for adaptive location sharing based on proximity may be implemented.

In some implementations disclosed herein, a location sharing service enables a first individual (a "target" person) to share the target person's current geographic location with another individual (a "monitoring" person) in some scenarios, but in other scenarios only share information that was derived from the target person's current geographic location but does not specify or indicate that geographic location. As used herein, a "geographic location" refers to a specific physical position or area that is fixed relative to the Earth, while a "location" may more broadly refer to either a geographic location or a position that is relative to one or more other people or things. Thus, for example, a particular latitude/longitude coordinate, an area bounded by multiple latitude/longitude coordinates, or a place name/alias/identifier that is known to be associated with one or more such coordinates (e.g., a city name, a street address, etc.) may be referred to herein as either a "location" or, more specifically, a "geographic location," while "with friends" or "in a safe place" may reflect "locations" in a general sense but are not "geographic locations."

The location sharing service may condition the sharing of geographic locations on the proximity of the target person to at least a portion of a group of one or more designated entities. For example, a target person may share that he or she is currently "with friends" when near one or more designated people (or "in a safe place" when at a designated place, etc.), without necessarily sharing any information indicative of his or her current geographic location. Conversely, the target person may share his or her precise geographic location when not near any designated person (or not at any designated place, etc.). In this manner, in at least some implementations and scenarios, a monitoring person may enjoy the peace of mind that comes with always knowing either (1) the geographic location of the target person, or (2) that the target person is in a low-risk and/or familiar situation and/or place.

To determine whether proximity criteria are met (e.g., being within a threshold distance of a designated person or place), the target person's geographic location may, at his or her option, be shared with a provider of the location sharing service. For example, the target person's smartphone may utilize global positioning satellite (GPS) and/or WiFi positioning technology, and may send information indicative of the current geographic location of the smartphone (or information that enables the calculation or determination of the current geographic location) to a remote server on a periodic or other suitable basis. The server may also determine current geographic locations associated with each of one or more members of a "group" that was previously set or designated for the target person. For example, the group may include, or consist entirely of, all members of an emergency contacts list that the target person had set up via his or her smartphone (e.g., if each of those contacts also agreed to share location information with the location sharing service provider), or may include, or consist entirely of, one or more physical locations/places designated by the target person (e.g., a set of street addresses, etc.). In this manner, proximity can be detected by comparing the target persons' current geographic location to the current and/or fixed geographic locations of group members.

In some implementations and/or scenarios, the information that is shared with a monitoring person when the target person is proximate to at least one group member bears no obvious relation to location, despite being dependent upon the target person's current geographic location. For example, the location sharing service provider may cause a "not available" status to be displayed to the monitoring person when the target person is at a designated location (e.g., work), or with one of a designated group of people, without explicitly indicating to the monitoring person that the target person's availability is a function of his or her current geographic location.

Example System

FIG. 1 illustrates an example system 100 in which techniques for adaptively sharing location based on proximity may be implemented. The example system 100 includes a location sharing server 102, a mobile communications device 104 of a target person, a mobile communications device 106 of a monitoring person, a network 110, a location database 112 and a location sharing database 114. While shown as two single, distinct databases, location database 112 and location sharing database 114 (described further below) may instead be combined as a single database, or one or both databases may be distributed among a plurality of co-located or remote databases.

Location sharing server 102 is remote from mobile communications devices 104, 106, and is communicatively coupled to mobile communications devices 104, 106 via network 110. Network 110 may include any suitable combination of wired and/or wireless communication networks, such as one or more local area networks (LANs), metropolitan area networks (MANs), and/or wide area network (WANs). As just one specific example, network 110 may include a cellular network, the Internet, and a server-side LAN. In some implementations, the portion(s) of network 110 used by mobile communications device 104 to communicate with location sharing server 102 may be wholly or partially separate from and independent of the portion(s) of network 110 that are used by mobile communications device 106 to communicate with location sharing server 110. While FIG. 1 shows only mobile communications devices 104, 106, it is understood that location sharing server 102 may also be in communication with numerous other mobile communications devices similar to mobile communications device 104 and/or mobile communications device 106. Moreover, while referred to herein as a "server," location sharing server 102 may, in some implementations, include multiple co-located or remotely distributed computing devices.

While shown in FIG. 1 as having a smartphone form factor, mobile communications device 104 may be any mobile or portable computing device with wireless communication capability (e.g., a smartphone, a tablet computer, a laptop computer, a wearable device such as smart glasses or a smart watch, a vehicle head unit computer, etc.). In other implementations, the components and functionality of mobile communications device 104 described below are distributed among two or more devices, such as a smartphone and a smart watch of the target person. In the example implementation of FIG. 1, mobile communications device 104 includes a processor 120, a memory 122, a user interface 124, a network interface 126, and a GPS unit 128. The processor 120 may be a single processor (e.g., a central processing unit (CPU)), or may include a set of processors (e.g., a CPU and a graphics processing unit (GPU)).

Memory 122 is a computer-readable, non-transitory storage unit or device, or collection of units/devices, that may include persistent (e.g., hard disk) and/or non-persistent memory components. Memory 122 stores instructions that are executable on processor 120 to perform various operations, including the instructions of various software applications and the data generated and/or used by such applications. In the example implementation of FIG. 1, memory 122 stores at least a location sharing application 130 and contacts data 132. While not shown in FIG. 1, memory 122 may also store a positioning application (e.g., within a mapping application) that utilizes GPS unit 128 to determine the geographic location of the mobile communications device 104. Generally, location sharing application 130 (and any positioning application) is executed by processor 120 to access the location sharing services (and positioning services, if available) provided by location sharing server 102. While the description below refers to a location sharing "application," it is understood that, in other implementations, other arrangements may be used to access the services provided by location sharing server 102. For example, mobile communications device 104 may instead access some or all of the location sharing services via a web browser provided by a web browser application stored in memory 122.

User interface 124 includes hardware, firmware and/or software configured to enable a user to interact with (i.e., both provide inputs to and perceive outputs of) the mobile communications device 104. For example, user interface 124 may include a touchscreen with both display and manual input capabilities. Alternatively, or in addition, user interface 124 may include a keyboard for accepting user inputs, and/or a microphone (with associated processing components) that provides voice control/input capabilities to the user.

Network interface 126 includes hardware, firmware and/or software configured to enable mobile communications device 104 to wirelessly exchange electronic data with location sharing server 102 via network 110. For example, network interface 126 may include a cellular communication transceiver, a WiFi transceiver, and/or transceivers for one or more other wireless communication technologies.

The GPS unit 128 includes hardware, firmware and/or software configured to enable mobile communications device 104 to self-locate using GPS technology (alone, or in combination with the services of location sharing server 102 and/or another server not shown in FIG. 1). Alternatively, or in addition, mobile communications device 104 may include a unit configured to self-locate, or configured to cooperate with a remote server or other device(s) to self-locate, using other, non-GPS technologies. For example, mobile communications device 104 may include a unit configured to self-locate using WiFi positioning technology (e.g., by sending signal strengths detected from nearby access points to location sharing server 102 along with identifiers of the access points, or to another server configured to retrieve access point locations from a database and calculate the position of mobile communications device 104 using trilateration or other techniques).

Mobile communications device 106 may be the same as, or similar to, mobile communications device 104. For example, mobile communications device 106 includes a processor 140 that may be similar to processor 120, a memory 142 that may be similar to memory 122, a user interface 144 that may be similar to user interface 124, and a network interface 146 that may be similar to network interface 126. Moreover, memory 142 stores a location sharing application 150 that may be similar to location sharing application 130, and contacts data 152 that may be similar to contacts data 132 (but including different contact information that is specific to the monitoring person). In some implementations, mobile communications device 106 also includes a GPS unit similar to GPS unit 128. In some implementations, device 106 may instead be a non-mobile, non-portable device, such as a desktop computer, for example.

Location sharing server 102 may be associated with (e.g., owned and/or maintained by) a location sharing service provider, and includes a network interface 160, a memory 162 and a location sharing module 170. The network interface 160 includes hardware, firmware and/or software configured to enable location sharing server 102 to exchange electronic data with mobile communications devices 104, 106 and other mobile communications devices via network 110. For example, network interface 160 may include a wired or wireless router and a modem.

Memory 162 is a computer-readable, non-transitory storage unit or device, or collection of units/devices, that may include persistent (e.g., hard disk) and/or non-persistent memory components. Memory 162 may store data that is generated and/or used by location sharing module 170, for example. In some implementations, location sharing server 102 also includes one or more other modules, such as a positioning module that assists mobile communications devices in self-locating and/or a mapping module that provides map and/or navigation services (e.g., providing map tile data and/or directions) to mobile communications devices such as mobile communications devices 104, 106. In some implementations, location sharing module 170 is just one component of a mapping or other module.

Location sharing module 170 is generally configured to provide location sharing services to clients devices, such as mobile communications device 104 and mobile communications device 106. Location sharing module 170 includes a sharing configuration unit 172, a proximity detection unit 174 and a notification unit 176. For each different target person using a location sharing application to share location information, sharing configuration unit 172 generally configures (e.g., in response to user entries) location sharing settings to specify the monitoring person or people with whom current locations are to be shared.

Also for each target person, sharing configuration unit 172 may configure the settings to specify a sharing mode. For example, a first sharing mode may result in the current geographic location of the target person being continuously available for sharing (e.g., whenever requested by a monitoring person, or periodically, etc.), and a second sharing mode may result in the current geographic location of the target person being available for sharing only when certain proximity-related criteria are not met. In one implementation, the second sharing mode results in the current geographic location being shared only when the target person is not proximate to any members/entities of a group, but instead results in other types of information (that do not specify geographic location) being shared when the target person is proximate to one or more members/entities of the group. The settings configured by sharing configuration unit 172 may also specify the people and/or places that constitute each such group, and possibly also whether each person (if any) in the group has agreed to share his or her geographic locations with the location sharing service provider. The settings for each target person may be stored in location sharing database 114.

Group members may be designated in various different ways, depending upon the implementation. For example, a target person may select, or enter information (e.g., cell phone numbers) for, a set of one or more emergency contacts, either over a long period of time or in a single interactive session. As another example, a target person may select, or enter information (e.g., addresses) for, a set of one or more places. As yet another example, a software application executing on a target person's mobile communications device, and/or executing on location sharing server 102 or another server, may automatically identify locations that the target person visits with a high frequency, and either propose that the target person accept that place as a group member or automatically add the place as a group member.

Proximity detection unit 174 generally determines when various target persons are proximate to (e.g., at or near) any members of their respective groups of people and/or places as specified in location sharing database 114. In some implementations where the group includes people, proximity detection unit 174 may only determine whether a target person is proximate to a given group member if that group member has a location sharing application (e.g., the same as or similar to location sharing application 130) installed on his or her mobile communications device, and has configured his or her settings to indicate an agreement to share his or her current geographic location.

Proximity detection unit 174 may determine proximity for a particular target person by accessing location database 112, and comparing the current geographic location of the target person to the current geographic locations for each of one or more entities in the group associated with the target person. The current geographic locations of people may be represented in location database 112 by the current geographic location of their respective mobile communications devices. For example, the geographic locations may include GPS coordinates that location sharing server 102 or another server received from mobile communications devices. Alternatively, the geographic locations may have been determined by location sharing server 102 or another server based on WiFi information (e.g., access point identifiers and received signal strengths) received from mobile communications devices. In still other implementations and/or scenarios, the current geographic locations may have been determined in other ways, such as detecting that a person has "checked in" at a particular, physical place via a social media service, for example.

Location sharing server 102 (or another server responsible for collecting the geographic location data stored in location database 112) may collect such information only for individuals (whether a target person or a member of a target person's group) who have expressly agreed to share such information with the location sharing service provider. The geographic locations may be automatically uploaded by the respective mobile communications devices at regular intervals, for example, or only upon a request from location sharing server 102 or another server (e.g., in response to a monitoring person requesting live location status), etc. In implementations where a target person's group can also, or instead, include one or more places, the current geographic location of each place stored in location database 112 may simply be the static/fixed geographic location of the place (e.g., latitude/longitude coordinates associated with an address of the place).

While current geographic locations are described in connection with FIG. 1 as being stored in and retrieved from location database 112, it is understood that, in some implementations, the geographic locations for people and/or places are not maintained in location database 112 or any other database, but are instead obtained directly form mobile communications devices or other devices on an as-needed basis. For example, proximity detection unit 174 may, when deciding whether to share the current geographic location of the target person associated with mobile communications device 104 (e.g., at a periodic interval, or upon receiving a request from mobile communications device 106), cause network interface 160 to send one location request message to mobile communications device 104 to directly obtain the target person's geographic location, and send additional location request messages to the mobile communications devices of a number of other individuals (not shown in FIG. 1) who are members of the group by which the target person's proximity is measured.

Notification unit 176 generally determines whether and when location-related information should be sent to the devices (e.g., smartphones, smart watches, laptop or desktop computers, etc.) of various different monitoring persons, generates the appropriate information, and causes network interface 160 to send the information to the appropriate recipient devices via network 110. To determine whether/when location-related information should be sent, notification unit 176 may first check a target person's settings in location sharing database 114. If a particular target person's settings indicate that his or her geographic location is to be continuously available for sharing, notification unit 176 may retrieve the target person's current geographic location from location database 112, and send data indicative of that geographic location to the respective monitoring person, upon request from the monitoring person (or periodically, etc.). If the target person's settings instead indicate that his or her geographic location is only to be available for sharing if certain proximity criteria are not met, then notification unit 176 may condition the sending of the current geographic location not only on appropriate timing factors (e.g., whether location has been requested by the monitoring person), but also on the determination, by proximity detection unit 174, of whether the target person is currently proximate to any group member(s).

When notification unit 176 determines that a geographic location should not be shared due to lack of proximity, notification unit 176 may instead generate and send data that causes the mobile communications device of the respective monitoring person to display a location-based status. While derived from the target person's geographic location, the location-based status does not reveal that geographic location. The status may be represented as a text-based message such as "with friends" (e.g., if proximity detection unit 174 determined the target person is within a threshold distance of at least one designated person), or "in a safe place" (e.g., if proximity detection unit 174 determined the target person is at, or within a threshold distance of, at least one designated place), for example. The data sent to the mobile communications device of the monitoring person to trigger display of the location-based status may include the location-based status itself, or may simply include data indicating that the location-based status should be displayed. In some implementations, semantic location technology is used to convert all geographic locations into text descriptions for user interface consistency (i.e., such that text is used both to convey geographic locations, and to convey location-based statuses that do not indicate geographic location).

In some implementations, a status that is not text-based is used to provide information to the monitoring person. For example, notification unit 176 may send to the mobile communications device of a monitoring person data that causes a displayed icon (or name, etc.) to have a particular color (e.g., green to indicate the target person is in a safe place, if the target person is proximate to one or more group members).

In some implementations, location sharing module 170 may be (or may include) a set of one or more processors that execute software instructions stored in memory 162 (or elsewhere) to perform the functions described herein, or may share a set of one or more processors. Alternatively, location sharing module 170 may be a component of software stored in memory 162 (or elsewhere) and executed by one or more processors (not shown in FIG. 1) of location sharing server 102 to perform the functions described herein. In some implementations, location sharing server 102 may include more, fewer and/or different modules or units than are shown in FIG. 1.

Different aspects of the operation of the system 100 will now be described with reference to two example scenarios. In particular, a first scenario is described with reference to FIG. 2, and a second scenario is described with reference to FIGS. 3A-3J.

Figure 2:
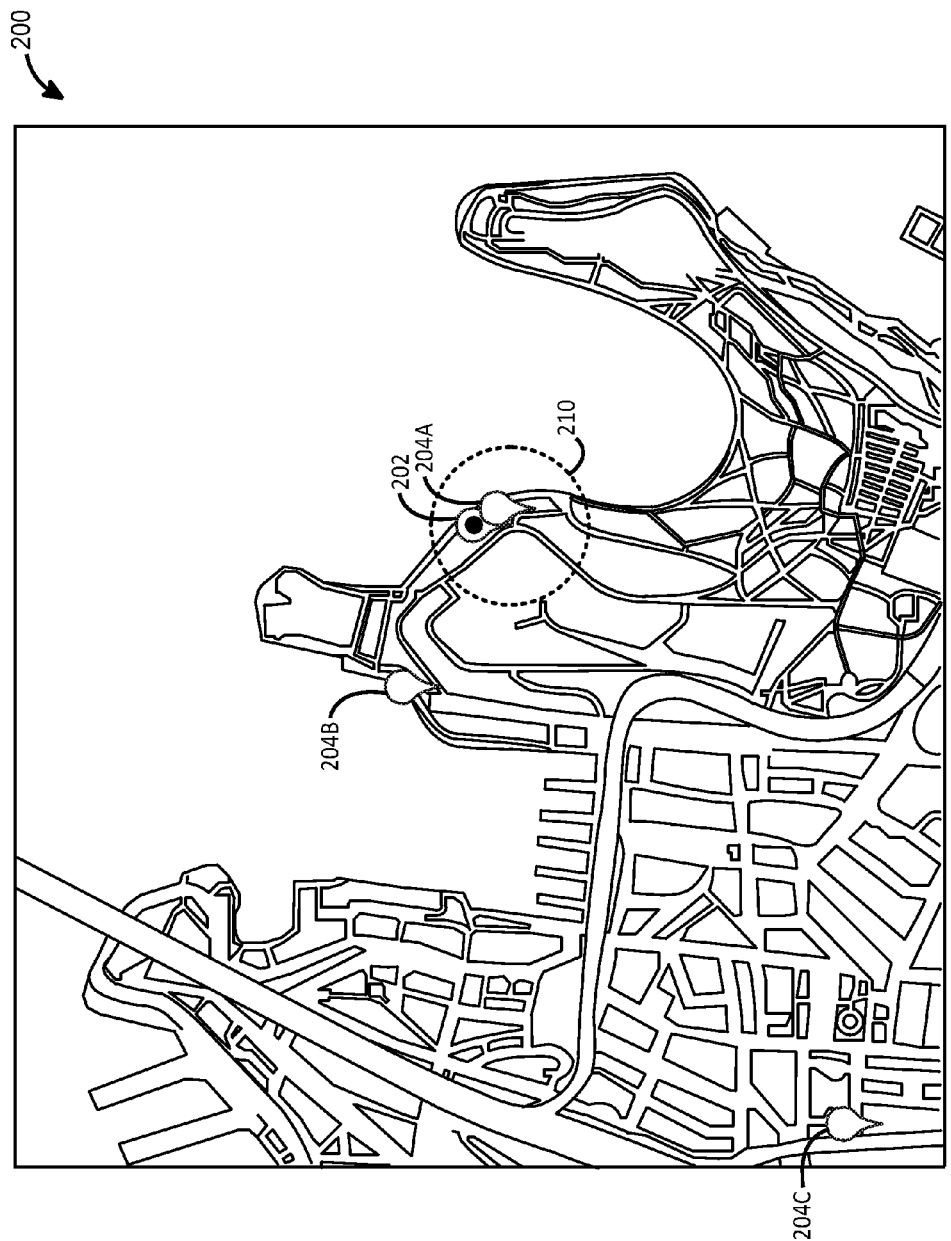
FIG. 2 depicts a map reflecting an example scenario in which a target person is proximate to one member of a designated group.

In the scenario illustrated by a map 200 of FIG. 2, the target person associated with mobile communications device 104 is at a geographic location 202, while three other individuals are at locations 204A-204C, respectively. The individuals at geographic locations 204A-204C may be individuals who, according to the settings stored in location sharing database 114, are members of a group associated with the target person. For example, each of the three individuals may be included on an "emergency contacts" list associated with the target person (e.g., stored on the mobile communications device 104 and/or in location sharing database 114), and may have a mobile communications device executing an application similar to location sharing application 130 of FIG. 1. It is noted that the map 200 is depicted in FIG. 2 merely to illustrate a particular scenario, and does not necessarily reflect any digital or other type of map that has been generated or displayed.

In the example scenario of FIG. 2, the location sharing settings for the target person indicate that he has elected to share his current geographic location only when he is within a threshold distance (e.g., 50 meters, 200 meters, a quarter kilometer, one mile, etc.) of at least one member of the group that includes the three individuals (and possibly other not in the area represented by the map 200). Relative to the geographic location 202, the threshold distance is represented in FIG. 2 by the dashed-line circle 210. The threshold distance may be an automatic default distance, or a distance selected by the target person, for example. In some implementations, the threshold distance may vary dynamically based on one or more factors, such as whether proximity is being measured with respect to a person or a place, or the current degree of uncertainty in determining a precise geographic location, etc.

As seen in FIG. 2, the geographic location 202 of the target person is within the threshold distance of the geographic location 204A of one group member, but is not within the threshold distance of the geographic locations 204B, 204C of the other two group members. In one implementation, such a scenario causes proximity detection unit 174 to determine that the proximity criteria (for withholding the sharing of geographic location) have been met, which in turn causes notification unit 176 to trigger the display of a location-based status at mobile communications device 106 that does not reveal geographic location (e.g., "with friends," "safe," "not available," etc.). For example, proximity detection unit 174 may apply proximity criteria that only require that the target person be within the threshold distance of at least one group member.

In other implementations, proximity detection unit 174 applies different proximity criteria. For example, proximity detection unit 174 may determine that the proximity criteria have been met only if the target person is within the threshold distance of at least two group members (or all group members, etc.), in which case the scenario of FIG. 2 would result in the geographic location 202 being shared with mobile communications device 104 rather than a status that does not reveal the geographic location 202. As another example, proximity detection unit 174 may determine that the proximity criteria have been met only if the target person is within a first threshold distance of a first group member and also within a larger, second threshold distance of a second group member, etc. Other suitable proximity criteria are also possible.

While FIG. 2 has been described above with respect to an implementation and scenario where geographic locations 204A-204C are locations of people, some or all of geographic locations 204A-204C may instead be locations of places. That is, geographic locations 204A-204C may be the locations of places that, according to the settings stored in location sharing database 114, are entities within a group associated with the target person. For example, each of the three places may be included on a "places" list associated with the target person (e.g., a list that may also be used for navigation and/or other purposes). In such an implementation, proximity detection unit 174 may determine that the proximity criteria (for withholding the sharing of geographic location) have been met due to geographic location 204A being within the area 210, which in turn may cause notification unit 176 to trigger the display of a status at mobile communications device 106 that does not reveal geographic location (e.g., "in a safe place," "not available," etc.). In some implementations, the threshold distance used by proximity detection unit 174 to detect the target person's proximity to a place is set to a value that is low enough to indicate that the target person is very likely inside/at the place, but high enough to account for uncertainty in the fixed geographic location recorded for the place and/or uncertainty in the geographic location of the target person.

Referring next to FIGS. 3A-3J, the example interactive user interface displays therein correspond to a scenario in which "Allison," a friend of "Carolyn," is going to see a concert at Barrowland in Glasgow with one or more other friends. With respect to FIG. 1, Allison may be the target person associated with mobile communications device 104, and Carolyn may be the monitoring person associated with mobile communications device 106, for example. The displays of FIGS. 3A, 3B, 3I and 3J may be presented to Carolyn on mobile communications device 106 via user interface 144, and the displays of FIGS. 3C-3H may be presented to Allison on mobile communications device 104 via user interface 124. It is understood that the displays of FIGS. 3A-3J are merely exemplary, and that one, some or all of the displays may instead (or additionally) present other types of information and/or controls, and/or may present some or all of the information and/or controls shown in a different format or sequence. FIGS. 3A-3J, and the description below, correspond to an example, implementation in which a person's "emergency contacts" constitute the group by which proximity detection unit 174 of FIG. 1 measures that person's proximity.

The example display 220 of FIG. 3A may be presented to Carolyn shortly after Allison has added Carolyn as an emergency contact (e.g., via settings entered by Allison via user interface 124 of mobile communications device 104 and thereafter stored in location sharing database 114). As seen in FIG. 3A, the display 220 includes a first area 222 corresponding to Carolyn (i.e., the user of the mobile communications device 106 presenting the display 220), a second area 224 corresponding to individuals currently sharing live geographic location status with Carolyn (here, only "Jeff Adams"), a third area 226 corresponding to the emergency contacts of Carolyn (here, both Allison and "Ben Walker"), and a fourth area 228 corresponding to the other, non-emergency contacts of Carolyn (here, only "Clark Brown").

A first interactive control 230 may enable Carolyn to share, or not share, her location (geographic location or otherwise) with others. The interactive control 230 may universally control location sharing with Carolyn's emergency contacts, to at least some degree (e.g., a setting of "no sharing" may override any other, person-specific settings), and any modification of the of the interactive control 230 may be communicated to location sharing server 102 via network 110. Location sharing server 102 may then, based on that information, modify (if needed) the location sharing settings in location sharing database 112 that are specifically associated with Carolyn.

A second interactive control 232 may enable Carolyn to add additional contacts, including any that she wishes to designate as "emergency" contacts. Any new emergency contact that is added via interactive control 232 may also be communicated to location sharing server 102 via network 110. Location sharing server 102 may then, based on that information, add information (e.g., a mobile communications device number) to the location sharing settings in location sharing database 112 that are specifically associated with Carolyn.

As seen in FIG. 3A, the geographic location of Jeff Adams in area 224 is provided at a low level of specificity ("out and about, in George Square"). For example, Jeff Adams may have opted to only share generalized geographic location information. In other implementations and/or scenarios, the geographic location of Jeff Adams may be presented with more specificity (e.g., a street address, and/or an icon at a specific location on a digital map, etc.).

As is also seen in FIG. 3A, the area 226 presents a message indicating that Allison has just recently been added as an emergency contact of Carolyn. For example, Carolyn may have requested that Allison add her as an emergency contact before she went to the concert, and Allison may have used one or more user interface controls (e.g., including a control similar to interactive control 232) to add Carolyn as an emergency contact.

The example display 240 of FIG. 3B, also presented to Carolyn, may correspond to a time shortly after Carolyn has selected Allison (e.g., by pressing Allison's icon or name in the area 226 of display 220), causing a set of controls including a "Request live status" interactive control 242 to be presented in connection with Allison.

The example display 260 of FIG. 3C, presented to Allison via user interface 124 of mobile communications device 104, corresponds to a time shortly after Carolyn has activated the interactive control 242 to request live status. In the display 260, a banner 262 indicates that Allison's geographic location ("at Barrowland, Glasgow") is about to be shared with Carolyn, and provides both a "Settings" interactive control 264 and a "Don't share" interactive control 266 to enable Allison to either adjust her location sharing settings, or prohibit any sharing of her location, respectively. The appearance of banner 262 may be accompanied by a one-time or periodic haptic alert, for example.

The example display 280 of FIG. 3D, also presented to Allison, corresponds to a time after Carolyn has seen a message indicating that Allison is "at Barrowland, Glasgow" (e.g., in a banner appearing to Carolyn via user interface 144 of mobile communications device 106). Thus, the banner 262 now indicates to Allison that Carolyn has already seen her location, while still presenting the interactive controls 264 and 266.

Figures 3E, 3F:
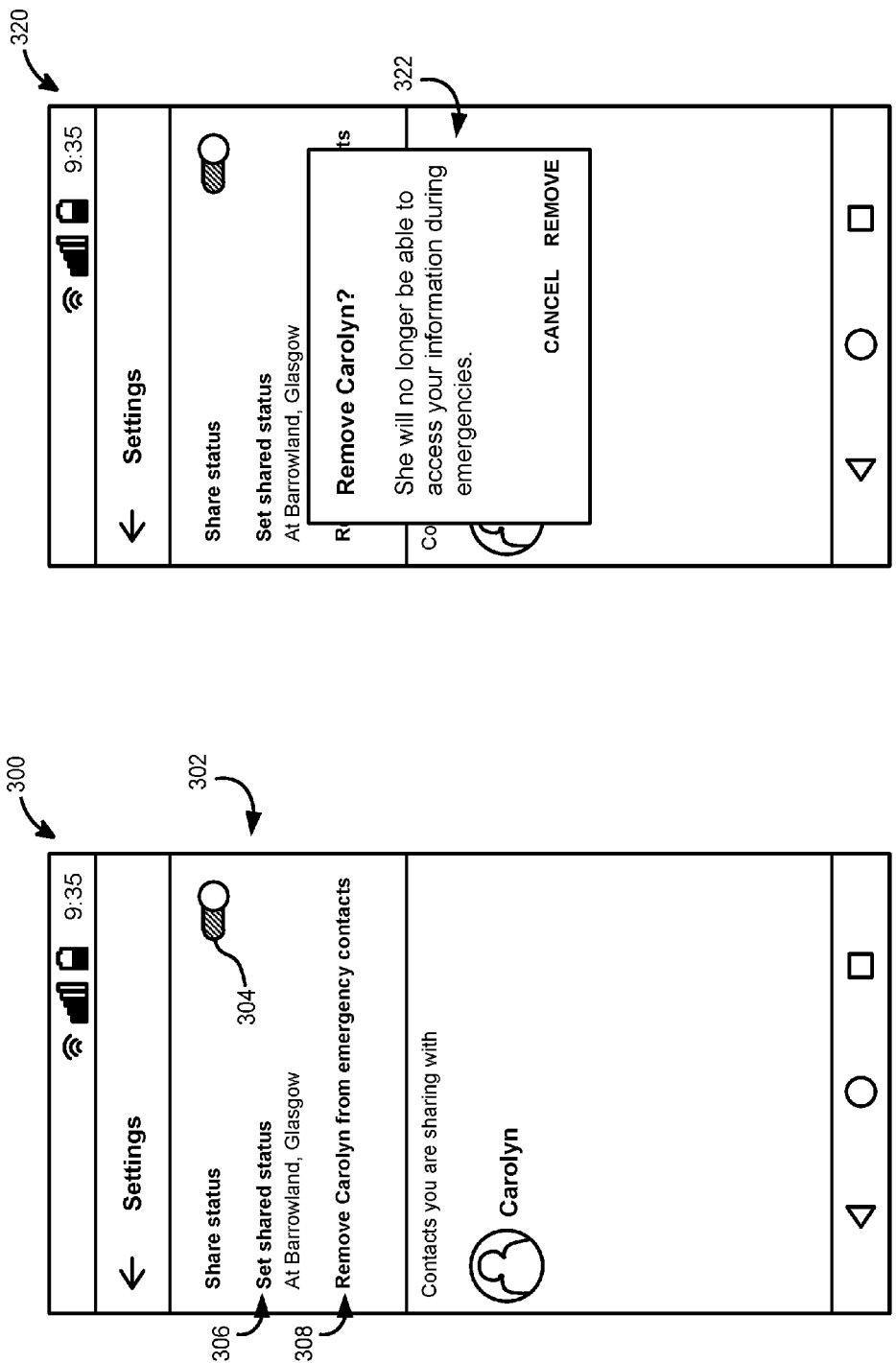

The example display 300 of FIG. 3E, also presented to Allison, corresponds to a time shortly after Allison activates the interactive control 264. For example, Allison may have noticed a haptic alert associated with banner 262 only after her location was already shared with Carolyn, and then, in annoyance, pressed "Settings" to see what location sharing options are available. In the display 300, an area 302 provides a number of location sharing options. In particular, a first interactive control 304 may control whether Allison's location information is shared, or not shared, with Carolyn, and may have the same function as interactive control 266 of FIG. 3C or 3D. Alternatively, interactive control 304 may be similar to interactive control 230 of FIG. 3A, and may cause Allison's location information to universally be shared, or not shared, with everyone (i.e., with all of the people on Allison's emergency contacts list).

A second interactive control 306 in area 302 may enable Allison to change her location-sharing mode, as discussed further below in connection with FIG. 3G. A third interactive control 308 in area 302 may be activated to remove Carolyn from Allison's emergency contacts list. The example display 320 of FIG. 3F, also presented to Allison, corresponds to a time shortly after Allison activates the interactive control 308 (perhaps still annoyed at having had her privacy intruded upon). In the display 320, a window 322 informs Allison that, if she confirms the removal, Carolyn will no longer be able to access her location during emergencies. The window 322 also provides interactive controls enabling Allison to either confirm or cancel the removal operation.

The example display 340 of FIG. 3G, also presented to Allison, corresponds to a time shortly after Allison has canceled the removal operation, and instead activated (e.g., touched) the interactive control 306 to set her location-sharing mode. For example, the information/warning provided in window 322 may have made have given Allison second thoughts about proceeding with the removal. In the display 340, a window 342 enables Allison to either select her geographic location ("at Barrowland, Glasgow") or a location-based status that does not reveal geographic location ("out with friends") as her location status to be shared with Carolyn. In other implementations, other options may also be available in window 342 (or another area of display 340), such as an option that indicates Allison's geographic location at a lower level of specificity (e.g., simply "Glasgow"), or an option that indicates Allison is "not available," etc.

The example display 360 of FIG. 3H, also presented to Allison, corresponds to a time shortly after Allison has selected "out with friends" as her shared status setting in window 342 of display 340. That is, selection of the "out with friends" option may cause the window 362 to appear, with a field 364 enabling Allison to enter a name, phone number or email address of a nearby friend to be added as an emergency contact. The information may be entered in field 364 using virtual keys appearing in an area 366, for example. In some implementations, emergency contacts may also, or instead, be added in other ways (e.g., by browsing a list of contacts, selecting a contact, and then changing a setting associated with that contact), and/or emergency contacts may be added at times when those contacts/individuals are not nearby.

The example display 380 of FIG. 3I, presented to Carolyn, corresponds to a time after Allison has used window 364 of display 360 to add at least one of her friends with her at the concert as an emergency contact. A banner 382 appearing in display 380 informs Allison that her "out with friends" status has been shared. For example, Carolyn may have requested another location status via interactive control 242 of FIG. 3B, causing proximity detection unit 174 of FIG. 1 to determine that Allison (i.e., mobile communications device 104) is within the threshold distance of at least one of her friends that she had just added as an emergency contact. Notification unit 176 of FIG. 1 then may have sent the "Allison is out with friends" status message (or other data triggering that message) to mobile communications device 106 for display in banner 382.

The example display 400 of FIG. 3J, also presented to Carolyn, corresponds to a later time when Allison is driving or riding back home from the concert. The display 400 includes a banner 402 that informs Allison that her geographic location ("traveling by car, Gallowgate") has been shared with Carolyn. For example, Carolyn may have requested still another location status via interactive control 242 of FIG. 3B, causing proximity detection unit 174 of FIG. 1 to determine that Allison (i.e., mobile communications device 104) is not within the threshold distance of any emergency contacts. Notification unit 176 of FIG. 1 then may have sent the "Allison is traveling by car, Gallowgate" status message to mobile communications device 106 for display in banner 402. While the example display 400 assumes that Allison's mode of travel (here, by car) can be ascertained, in other embodiments no such information is provided along with the geographic location.

As seen by the example implementation/scenario of FIGS. 3A-3J, privacy concerns may be better balanced with the concerns of others than is possible using current location sharing technologies. For example, while Carolyn could not ascertain Allison's whereabouts at all times, she could learn enough about Allison's whereabouts to have her curiosity be at least partially satisfied, and/or to know that Allison is likely safe.

Example Techniques for Adaptively Sharing Location Based on Proximity

An example method 500 for providing adaptive location sharing based on proximity is discussed next with reference to FIG. 4. The method 500 may be implemented as instructions stored on a computer-readable medium and executed on one or more processors in one or more computing devices. For example, the method 500 may be implemented by location sharing server 102 of FIG. 1.

At block 502, a group of one or more entities associated with a target person is identified. In some implementations and/or scenarios, the group includes at least two entities. The group may include one or more people associated with the target person (e.g., people on an "emergency contacts" list of the target person, or otherwise designated as being "trusted" people, etc.), and/or one or more places associated with the target person (e.g., home, work, etc.). Block 502 may include retrieving a list of contacts associated with the target person, a list of places associated with the target person, or a list of both people and places associated with the target person, from a database stored in a memory (e.g., from location sharing database 114 of FIG. 1), for example.

At block 504, location data is received from a first mobile communications device associated with the target person (e.g., from mobile communications device 104 of FIG. 1 via network 110). The location data is indicative of (e.g., specifies, or can be used to calculate/determine) a current geographic location of the target person. For example, the location data may indicate a latitude and longitude of the first mobile communications device (while being carried by the target person), as determined by a GPS unit (e.g., GPS unit 128 of FIG. 1). As another example, the location data may include WiFi access point identifiers and corresponding received signal strengths that were detected by the first mobile communications device. As yet another example, the location data may include an indication that the target person "checked in" at a particular place (with a fixed geographic location) via a user interface of the first mobile communications device.

At block 506, it is determined, using the location data received at block 504, that the target person is proximate to at least a first entity of the group. Block 506 may include determining whether the target person is within a threshold distance (e.g., one mile, 200 meters, 50 meters, 10 meters, etc., or possibly zero meters if one or more entities correspond to a two-dimensional geographic area rather than a single point location) of at least one entity within the group, for example. The threshold distance may be fixed, or may vary dynamically based on user settings, the nature of the first entity (e.g., whether a person or place), and/or based on other factors. The distance between the target person and the first entity may be determined by comparing geographic locations of the target person and the first entity. In some implementations (e.g., if the location data included WiFi access point identifiers and signal strengths), block 506 may include using the received location data to calculate/determine the geographic location of the target person. Block 506 may also include making one or more other determinations, such as whether the first entity (if a person) has agreed to share his or her current geographic location, calculating the geographic location of the first entity, and so on.

After the determination is made at block 506, a proximity message is generated at block 508. The proximity message may be generated solely in response to the determination made at block 506, for example, or may also be based on other factors. For example, the proximity message may be generated in response to both the determination at block 506 and a determination that the target person is proximate to a second entity of the group (e.g., in an implementation where current geographic locations are shared unless the target person is near at least two people on an emergency contacts list, etc.). The proximity message is discussed further below in connection with block 510.

At block 510, the proximity message is sent to a remote monitoring device (e.g., to mobile communications device 106 of FIG. 1 via network 110), to cause the remote monitoring device to display a location-based status of the target person. The location-based status does not specify any geographic location of the target person (such as a latitude/longitude, a position on a map, an indicator that the target person is at a specific place with a known, fixed address, etc.). In some implementations, the location-based status also does not specify any particular person who is proximate to the target person, even if the group of entities is a group of people (e.g., emergency contacts). If the first entity (and possibly a number of other proximate entities from the group) is a person rather than a place, for example, the location-based status may indicate whether the target person is with one or more trusted people (e.g., "safe," "out with friends," etc.), without specifying names or other identifiers of those people. As another example, if the first entity is a place rather than a person, the location-based status may indicate whether the target person is in a trusted or familiar place (e.g., "safe," "at known location," etc.) without identifying the specific place. As yet another example, the location-based status may indicate availability of the target person (e.g., "available," "busy," etc.), without revealing the specific place or person whose proximity resulted in that status being shown. In some implementations, the location-based status is not text-based, and instead includes an icon, color-code and/or other indicator. For example, an icon showing two people together may be used to indicate that the target person is with friends, or an icon with an image of the target person may be outlined in green to indicate the target person is in a safe place, etc. The proximity message sent at block 508 may include the location-based status ultimately displayed by the remote monitoring device, or may include data that the remote monitoring device recognizes as a trigger to locally generate the location-based status.

Figure 4:
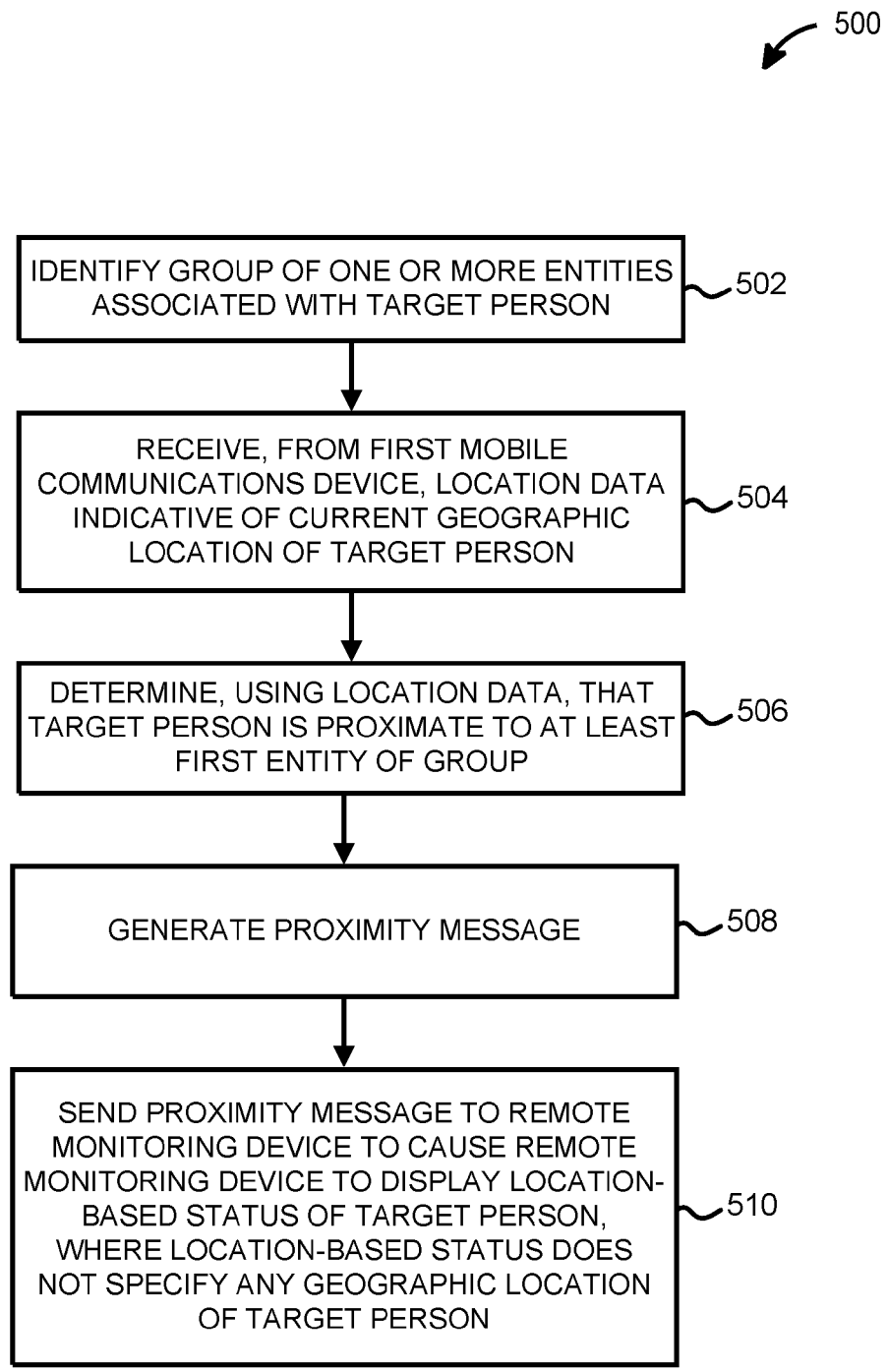
FIG. 4 is a flow diagram of an example method for providing adaptive location sharing based on proximity.

The method 500 may also include one or more additional blocks not shown in FIG. 4. For example, the method 500 may include sending the current geographic location to the remote monitoring device, for display along with the location-based status. In other implementations or scenarios, the computing device(s) implementing the method 500 never send(s) any message indicating the current geographic location of the target person to the monitoring device, although other, future (and/or past) current geographic locations may be (and/or have been) sent in situations where proximity to a group member is (or was not) detected. For instance, the method 500 may include receiving, from the first mobile communications device of the target person, new location data indicative of a new current geographic location of the target person, and using the new location data to determine that the target person is no longer proximate to any entity of the group. The method 500 may also, thereafter, include generating a location message specifying the new current geographic location, and sending the location message to the remote monitoring device to cause the remote monitoring device to display the new current geographic location.

Example Techniques for Managing Sharing of Location-Based Status Information

Figure 5:
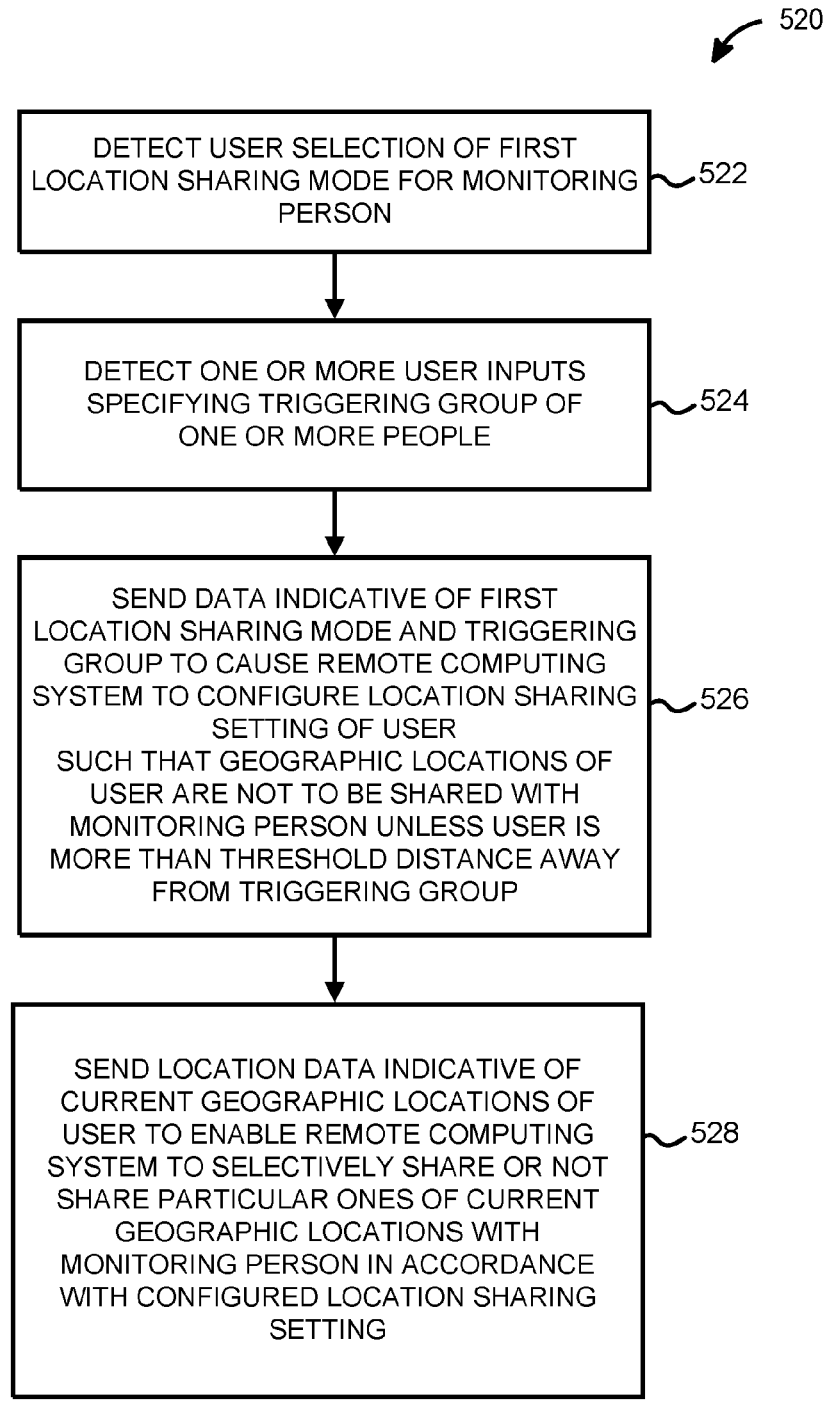
FIG. 5 is a flow diagram of an example method for managing sharing of location-based status information with another person.

An example method 520 for managing sharing of location-based status information with a monitoring person is discussed next with reference to FIG. 5. The method 520 may be implemented as instructions stored on a computer-readable medium and executed on one or more processors in a mobile communications device. For example, the method 520 may be implemented by processor 120 of mobile communications device 104 in FIG. 1.

At block 522, a user selection of a first location sharing mode for the monitoring person, made via a user interface of the mobile communications device (e.g., user interface 124 of FIG. 1), is detected. The first location sharing mode is one that the user selected from among a plurality of available location sharing modes. For example, the first location sharing mode may be one in which the user's current geographic location is shared with the monitoring person only in certain, proximity-dependent circumstances, another location sharing mode may be one in which the user's current geographic location is shared with the monitoring person regardless of proximity, and still another location sharing mode may be one in which the user's current geographic location is never shared with the monitoring person.

At block 524, one or more user inputs, made via the user interface and specifying a triggering group of one or more people, are detected. For example, the user may have utilized one or more interactive controls presented on the user interface to designate one or more people as "emergency contacts" stored in a memory of the mobile communications device (e.g., in contacts data 132 of memory 122 in FIG. 1), with each of those emergency contacts being added to the triggering group. In some implementations and/or scenarios, the triggering group includes at least two people.

At block 526, data indicative of the first location sharing mode and the triggering group is sent to a remote computing system (e.g., to location sharing server 102 of FIG. 1, via network 110), to cause the remote computing system to configure a location sharing setting of the user (e.g., a setting stored in location sharing database 114 of FIG. 1). In particular, the remote computing system is caused to configure the location sharing setting such that geographic locations of the user are not to be shared with the monitoring person unless the user is more than a threshold distance away from the triggering group (i.e., from each and every person within the triggering group).

At block 528, location data indicative of current geographic locations of the user (e.g., GPS-generated latitude/longitude coordinates, WiFi access point identifiers and signal strengths, etc.) is sent to the remote computing system, to enable the remote computing system to selectively share or not share particular ones of the current geographic locations with the monitoring person (e.g., with the mobile communications device 106 of FIG. 1) in accordance with the configured location sharing setting. For example, the remote computing system may selectively, for each of the current geographic locations, either cause another mobile communications device associated with the monitoring person (e.g., mobile communications device 106 of FIG. 1) to display a location-based status of the user (with the location-based status not specifying that current geographic location), or cause the mobile communications device associated with the monitoring person to display that current geographic location.

Example Aspects of the Invention

Although the foregoing text sets forth a detailed description of numerous different aspects and embodiments of the invention, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1—A method, implemented in one or more servers having one or more processors, for providing adaptive location sharing based on proximity, the method comprising: identifying, by the one or more processors, a group of one or more entities associated with a target person, the one or more entities including one or both of (i) one or more people associated with the target person and (ii) one or more places associated with the target person; receiving, by the one or more processors and from a first mobile communications device associated with the target person, location data indicative of a current geographic location of the target person; determining, by the one or more processors and using the location data, that the target person is proximate to at least a first entity of the group; after determining that the target person is proximate to at least the first entity, generating, by the one or more processors, a proximity message; and sending the proximity message to a remote monitoring device to cause the remote monitoring device to display a location-based status of the target person, wherein the location-based status does not specify any geographic location of the target person.

Aspect 2—The method of aspect 1, wherein the location-based status of the target person indicates one or more of: whether the target person is in a trusted place; whether the target person is with one or more trusted people; or availability of the target person.

Aspect 3—The method of aspect 1, wherein identifying a group of one or more entities associated with the target person includes identifying one or more people associated with the target person; and determining that the target person is proximate to at least a first entity of the group includes determining that the target person is proximate to at least a first person of the group.

Aspect 4—The method of aspect 3, wherein identifying the one or more people associated with the target person includes retrieving a list of contacts associated with the target person from a database stored in a memory.

Aspect 5—The method of aspect 3, wherein: the method further comprises receiving, by the one or more processors, additional location data from a second mobile communications device associated with the first person, the additional location data being indicative of a current geographic location of the first person; and determining that the target person is proximate to at least a first entity of the group includes determining that the target person is within a threshold distance of at least the first person using (i) the current geographic location of the target person and (ii) the current geographic location of the first person.

Aspect 6—The method of any one of aspects 1-5, wherein the one or more servers do not send any message indicating the current geographic location of the target person to the monitoring device.

Aspect 7—The method of aspect 1, wherein: identifying a group of one or more entities associated with the target person includes identifying one or more places associated with the target person; and determining that the target person is proximate to at least a first entity of the group includes determining that the target person is proximate to at least a first place of the group.

Aspect 8—The method of aspect 7, wherein identifying the one or more places associated with the target person includes retrieving a list of places associated with the target person from a database stored in a memory.

Aspect 9—The method of aspect 7, wherein determining that the target person is proximate to at least a first entity of the group includes determining that the target person is within a threshold distance of at least the first place using the current geographic location of the target person.

Aspect 10—The method of any one of aspects 1-9, wherein sending the proximity message to the remote monitoring device includes sending the location-based status to the remote monitoring device.

Aspect 11—The method of any one of aspects 1-10, wherein the location-based status is a text-based message.

Aspect 12—The method of any one of aspects 1-11, wherein sending the proximity message to a remote monitoring device includes sending the proximity message to a mobile communications device for display to a user.

Aspect 13—The method of any one of aspects 1-12, further comprising: receiving, by the one or more processors and from the first mobile communications device, new location data indicative of a new current geographic location of the target person; determining, by the one or more processors and using the new location data, that the target person is no longer proximate to any entity of the group; after determining that the target person is no longer proximate to any entity of the group, generating, by the one or more processors, a location message specifying the new current geographic location; and sending the location message to the remote monitoring device to cause the remote monitoring device to display the new current geographic location.

Aspect 14—A system for providing adaptive location sharing based on proximity, the system comprising: a first memory storing a database containing data associating each of a plurality of people with a respective one of a plurality of groups of one or more entities; one or more servers having one or more processors; and a second memory storing instructions that, when executed by the one or more processors, cause the one or more servers to (1) identify, by accessing the database, a group of one or more entities associated with the target person, the one or more entities including one or both of (i) one or more people associated with the target person and (ii) one or more places associated with the target person, (2) receive, from a first mobile communications device associated with the target person, location data indicative of a current geographic location of the target person, (3) determine, using the location data, that the target person is proximate to at least a first entity of the group, (4) after determining that the target person is proximate to at least the first entity, generate a proximity message, and (5) send the proximity message to a remote monitoring device to cause the remote monitoring device to display a location-based status of the target person, wherein the location-based status does not specify any geographic location of the target person.

Aspect 15—The system of aspect 14, wherein: the group of one or more entities associated with the target person includes one or more people associated with the target person; and the first entity of the group is a first person of the group.

Aspect 16—The system of aspect 15, wherein the instructions further cause the one or more servers to: receive additional location data from a second mobile communications device associated with the first person, the additional location data being indicative of a current geographic location of the first person; and determine that the target person is proximate to at least the first person at least by determining that the target person is within a threshold distance of at least the first person using (i) the current geographic location of the target person and (ii) the current geographic location of the first person.

Aspect 17—The system of aspect 14, wherein: the group of one or more entities associated with the target person includes one or more places associated with the target person; and the first entity of the group is a first place of the group.

Aspect 18—A method, implemented in a mobile communications device associated with a user, for managing sharing of location-based status information with a monitoring person, the method comprising: detecting a user selection, made via a user interface of the mobile communications device, of a first location sharing mode for the monitoring person from among a plurality of available location sharing modes; detecting one or more user inputs, made via the user interface, specifying a triggering group of one or more people; sending, to a remote computing system, data indicative of (i) the first location sharing mode, and (ii) the triggering group, to cause the remote computing system to configure a location sharing setting of the user such that geographic locations of the user are not to be shared with the monitoring person unless the user is more than a threshold distance away from the triggering group; and sending, to the remote computing system, location data indicative of current geographic locations of the user to enable the remote computing system to selectively share or not share particular ones of the current geographic locations with the monitoring person in accordance with the configured location sharing setting.

Aspect 19—The method of aspect 18, wherein detecting the one or more user inputs specifying the triggering group of one or more people includes: detecting one or more user inputs specifying one or more people included in a list of contacts stored on a memory of the mobile communications device.

Aspect 20—The method of aspect 18 or aspect 19, wherein sending the location data indicative of the current geographic locations of the user includes: sending the location data indicative of the current geographic locations of the user to enable the remote computing system to selectively, for each of the current geographic locations, either (i) cause another mobile communications device associated with the monitoring person to display a location-based status of the user, wherein the location-based status does not specify any geographic location of the user, or (ii) cause the other mobile communications device associated with the monitoring person to display the current geographic location of the user.

Other Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Unless specifically stated otherwise, discussions in the present disclosure using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in the present disclosure any reference to "one implementation" or "an implementation" means that a particular element, feature, structure, or characteristic described in connection with the implementation is included in at least one implementation or embodiment. The appearances of the phrase "in one implementation" in various places in the specification are not necessarily all referring to the same implementation.

As used in the present disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for adaptively sharing location based on proximity through the disclosed principles in the present disclosure. Thus, while particular embodiments and applications have been illustrated and described, it is to be understood that the disclosed embodiments are not limited to the precise construction and components disclosed in the present disclosure. Various modifications, changes and variations, which will be apparent to those skilled in the art, may be made in the arrangement, operation and details of the method and apparatus disclosed in the present disclosure without departing from the spirit and scope defined in the appended claims.

What is claimed is:

1. A method, implemented in one or more servers having one or more processors, for providing adaptive location sharing based on proximity, the method comprising:
   identifying, by the one or more processors, a group of one or more entities associated with a target person, the one or more entities including one or both of (i) one or more people associated with the target person and (ii) one or more places associated with the target person;
   receiving, by the one or more processors and from a first mobile communications device associated with the target person, first location data indicative of a first current geographic location of the target person at a first time;
   determining, by the one or more processors and using the first location data, that the target person is proximate to at least a first entity of the group at the first time;
   after determining that the target person is proximate to at least the first entity, generating, by the one or more processors, a first proximity message;
   sending the first proximity message to a remote monitoring device to cause the remote monitoring device to display a location-based status of the target person, wherein the location-based status does not specify any geographic location of the target person;
   receiving, by the one or more processors and from the first mobile communications device, second location data indicative of a second current geographic location of the target person at a second time different than the first time;
   determining, by the one or more processors and using the second location data, that the target person is not proximate to any entity of the group;
   after determining that the target person is not proximate to any entity of the group, generating, by the one or more processors, a second proximity message; and sending the second proximity message to the remote monitoring device to cause the remote monitoring device to display the second current geographic location of the target person, wherein a first sharing mode results in the current geographic location of the target person being continuously available for sharing, and wherein a second sharing mode (i) results in the current geographic location being shared only when the target person is not proximate to any entity of the group, and (ii) instead results in other information, which does not specify the current geographic location of the target person, being shared when the target person is proximate to one or more entities of the group.

2. The method of claim 1, wherein the location-based status of the target person indicates one or more of:
whether the target person is in a trusted place;
whether the target person is with one or more trusted people; or
availability of the target person.

3. The method of claim 1, wherein:
identifying a group of one or more entities associated with the target person includes identifying one or more people associated with the target person; and
determining that the target person is proximate to at least a first entity of the group at the first time includes determining that the target person is proximate to at least a first person of the group at the first time.

4. The method of claim 3, wherein identifying the one or more people associated with the target person includes retrieving a list of contacts associated with the target person from a database stored in a memory.

5. The method of claim 3, wherein:
the method further comprises receiving, by the one or more processors, additional location data from a second mobile communications device associated with the first person, the additional location data being indicative of a current geographic location of the first person; and
determining that the target person is proximate to at least a first entity of the group at the first time includes determining that the target person is within a threshold distance of at least the first person using (i) the first current geographic location of the target person and (ii) the current geographic location of the first person.

6. The method of claim 1, wherein the one or more servers do not send any message indicating the first current geographic location of the target person to the remote monitoring device.

7. The method of claim 1, wherein:
identifying a group of one or more entities associated with the target person includes identifying one or more places associated with the target person; and
determining that the target person is proximate to at least a first entity of the group at the first time includes determining that the target person is proximate to at least a first place of the group at the first time.

8. The method of claim 7, wherein identifying the one or more places associated with the target person includes retrieving a list of places associated with the target person from a database stored in a memory.

9. The method of claim 7, wherein determining that the target person is proximate to at least a first entity of the group at the first time includes determining that the target person is within a threshold distance of at least the first place using the current geographic location of the target person.

10. The method of claim 1, wherein sending the first proximity message to the remote monitoring device includes sending the location-based status to the remote monitoring device.

11. The method of claim 1, wherein the location-based status is a text-based message.

12. The method of claim 1, wherein sending the first proximity message to a remote monitoring device includes sending the first proximity message to a mobile communications device for display to a user.

13. A system for providing adaptive location sharing based on proximity, the system comprising:
a first memory storing a database containing data associating each of a plurality of people with a respective one of a plurality of groups of one or more entities;
one or more servers having one or more processors; and
a second memory storing instructions that, when executed by the one or more processors, cause the one or more servers to
identify, by accessing the database, a group of one or more entities associated with the target person, the one or more entities including one or both of (i) one or more people associated with the target person and (ii) one or more places associated with the target person,
receive, from a first mobile communications device associated with the target person, first location data indicative of a first current geographic location of the target person at a first time,
determine, using the first location data, that the target person is proximate to at least a first entity of the group at the first time,
after determining that the target person is proximate to at least the first entity, generate a first proximity message,
send the first proximity message to a remote monitoring device to cause the remote monitoring device to display a location-based status of the target person, wherein the location-based status does not specify any geographic location of the target person,
receive, from the first mobile communications device, second location data indicative of a second current geographic location of the target person at a second time different than the first time,
determine, using the second location data, that the target person is not proximate to any entity of the group,
after determining that the target person is not proximate to any entity of the group, generate a second proximity message, and
send the second proximity message to the remote monitoring device to cause the remote monitoring device to display the second current geographic location of the target person,
wherein a first sharing mode results in the current geographic location of the target person being continuously available for sharing, and
wherein a second sharing mode (i) results in the current geographic location being shared only when the target person is not proximate to any entity of the group, and (ii) instead results in other information, which does not specify the current geographic location of the target person, being shared when the target person is proximate to one or more entities of the group.

14. The system of claim 13, wherein:
the group of one or more entities associated with the target person includes one or more people associated with the target person; and
the first entity of the group is a first person of the group.

15. The system of claim 14, wherein the instructions further cause the one or more servers to:
receive additional location data from a second mobile communications device associated with the first person, the additional location data being indicative of a current geographic location of the first person; and
determine that the target person is proximate to at least the first person at the first time at least by determining that the target person is within a threshold distance of at least the first person using (i) the first current geographic location of the target person and (ii) the current geographic location of the first person.

16. The system of claim 13, wherein:
the group of one or more entities associated with the target person includes one or more places associated with the target person; and
the first entity of the group is a first place of the group.

17. A method, implemented in a mobile communications device associated with a user, for managing sharing of location-based status information with a monitoring person, the method comprising:
detecting a user selection, made via a user interface of the mobile communications device, of a first location sharing mode for the monitoring person from among a plurality of available location sharing modes, wherein the first location sharing mode results in a current geographic location of the user being continuously available for sharing, and wherein a second location sharing mode of the plurality of available location sharing modes (i) results in the current geographic location being shared only when the user is not proximate to any entity of a triggering group, and (ii) instead results in other information, which does not specify the current geographic location of the user, being shared when the user is proximate to one or more entities of the triggering group;
detecting one or more user inputs, made via the user interface, specifying the triggering group, wherein the specified triggering group includes one or more people;
sending, to a remote computing system, data indicative of (i) the first location sharing mode, and (ii) the specified triggering group, to cause the remote computing system to configure a location sharing setting of the user such that geographic locations of the user are not to be shared with the monitoring person unless the user is more than a threshold distance away from the specified triggering group; and
sending, to the remote computing system, location data indicative of current geographic locations of the user to enable the remote computing system to selectively share or not share particular ones of the current geographic locations with the monitoring person in accordance with the configured location sharing setting.

18. The method of claim 17, wherein detecting the one or more user inputs specifying the triggering group of one or more people includes:
detecting one or more user inputs specifying one or more people included in a list of contacts stored on a memory of the mobile communications device.

19. The method of claim 17, wherein sending the location data indicative of the current geographic locations of the user includes:
sending the location data indicative of the current geographic locations of the user to enable the remote computing system to selectively, for each of the current geographic locations, either (i) cause another mobile communications device associated with the monitoring person to display a location-based status of the user, wherein the location-based status does not specify any geographic location of the user, or (ii) cause the other mobile communications device associated with the monitoring person to display the current geographic location of the user.

* * * * *